L. BRUNO.
GRAFTING IMPLEMENT.
APPLICATION FILED OCT. 17, 1910. RENEWED NOV. 18, 1912.
1,064,127.
Patented June 10, 1913.
2 SHEETS—SHEET 1.
Fig. 1.
Fig. 2.
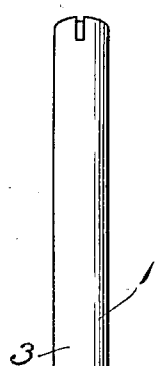
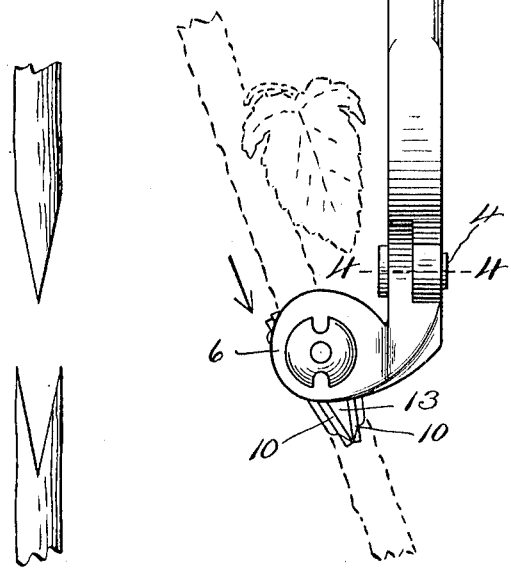
Fig. 3.
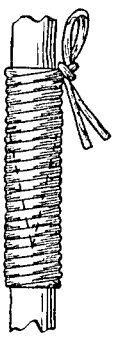
Fig. 4.
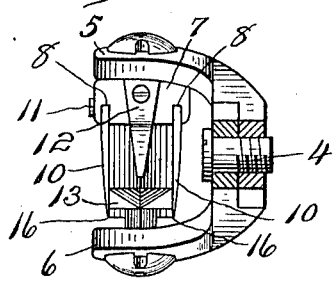
Witnesses
T. P. Britt
E. C. Duffy
Inventor
Lorenzo Bruno
By
Attorneys L. BRUNO.
GRAFTING IMPLEMENT.
APPLICATION FILED OCT. 17, 1910. RENEWED NOV. 18, 1912.
1,064,127.
Patented June 10, 1913.
2 SHEETS—SHEET 2.
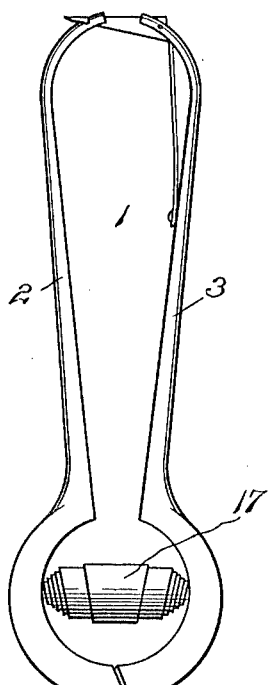
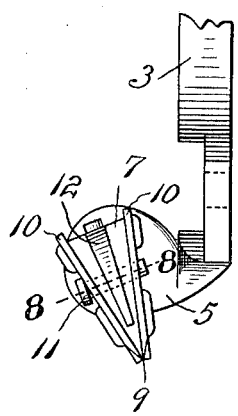
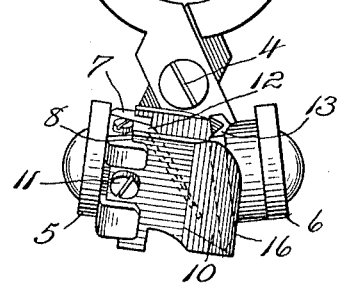
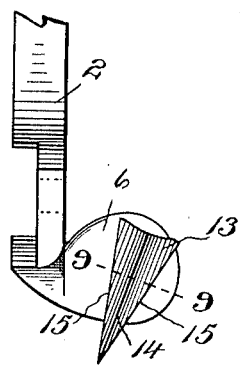
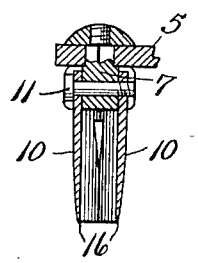
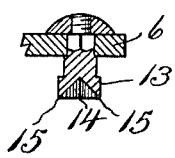
Witnesses
J. P. Britt
E. C. Duffy
Inventor
Lorenzo Bruno
By
Attorneys

UNITED STATES PATENT OFFICE.

LORENZO BRUNO, OF WASHINGTON, DISTRICT OF COLUMBIA.

GRAFTING IMPLEMENT.

1,064,127. Specification of Letters Patent. Patented June 10, 1913.

Application filed October 17, 1910, Serial No. 587,580. Renewed November 18, 1912. Serial No. 732,132.

*To all whom it may concern:*

Be it known that I, LORENZO BRUNO, a subject of the King of Italy, residing at Washington, District of Columbia, have invented certain new and useful Improvements in Grafting Implements; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a grafting instrument and has for its object to provide a device of this class to be employed for grafting vines such as grape, saplings and the like in any easy, quick and efficient manner.

A further object of the invention is to provide a grafting implement, the jaws and handle of which are so constructed and arranged that a grafting cut is made without first cutting the vine to receive the grafting implement.

A further object of this invention is to provide a grafting implement having the knives so constructed and arranged that they can be easily and quickly removed for the purpose of sharpening the same or for the purpose of supplying new knives.

With these objects in view the invention consists in the novel construction and arrangement of the implement which provides for applying the grafting cut to the vine or sapling without first cutting the vine or sapling to receive the grafting implement.

The invention therefore consists in the form or shape of the implement; and the invention also consists in the novel construction for holding the knives removably in position; and the invention also consists in certain other novel details of construction and in combinations of parts all of which will be first fully described and afterward specifically pointed out in the appended claims.

Referring to the accompanying drawings:

Figure 1 is an elevation of a grafting implement constructed in accordance with this invention and illustrating the same in operative position on a grape vine. Fig. 2 is an elevation illustrating the grafting cuts made by the implement. Fig. 3 is a fragmentary view illustrating two pieces of vine provided with the grafting cuts and placed in grafting position and wrapped as is the usual method. Fig. 4 is a rear end view of the implement, the handles being shown in section at the pivot thereof as on line 4—4 of Fig. 1, the view being in the direction of the arrow of Fig. 1. Fig. 5 is a plan view of the grafting implement. Fig. 6 is an inside plan view of one of the jaws of the implement illustrating the knives in position thereon. Fig. 7 is an inside plan view of the other jaw of the implement showing the knife in position thereon. Fig. 8 is a transverse sectional view through the knives and a portion of the jaw illustrated in Fig. 6 and taken on line 8—8 of Fig. 6, and Fig. 9 is a transverse sectional view through the knife and portion of the jaw illustrated in Fig. 7 and taken on line 9—9 of Fig. 7.

Like numerals of reference indicate the same parts throughout the several figures in which;

1 indicates the grafting implement which comprises the handle members 2 and 3 pivoted at 4 and the two jaws 5 and 6, said jaws 5 and 6 being as shown in Fig. 1 formed to one side of the longitudinal axis of the handle members 2 and 3 and extending a considerable distance to one side thereof, said jaws being in the nature of lateral extensions for a purpose which will be presently described.

Upon the inner face of the jaw 5 is formed or secured thereon a knife holding base 7 which as is shown in Fig. 4 is provided with two grooves 8, said grooves forming a V in the base 7 and meeting at their forward ends at 9 (Fig. 6). Within these grooves or channels 8 the knives 10 are arranged as shown and are secured therein by means of the screw 11 which passes through one of the knives 10 and through the base 7 and threads into the fellow knife 10 in the manner as shown in Figs. 6 and 8. Applied to the base 7 as shown in Figs. 5 and 6 is a leaf spring 12, said spring being normally in position shown in dotted lines in Fig. 5 and arranged to be engaged and depressed when the implement is in operative position on a vine or sapling in order to force the said vine or sapling from between the knives 10 after the grafting cut has been made.

The jaw 6 (Fig. 7) has provided thereon a single V-shaped knife 13 which as shown in Fig. 9 is hollowed out toward the center at 14 in order to provide converging cutting edges 15 along the entire length of the knife.

Having thus described the several parts of the implement it will be seen from Fig. 4 that when the jaws 5 and 6 are brought together or into operative position the knife 13 enters between the knives 10, the knife edges 15 on the knife 13 co-acting with the knife edges 16 on the knives 10. When therefore the implement is applied to the vine such as is illustrated in dotted lines in Fig. 1 a female V cut is made in the lower portion of the vine while a male V cut is made in the upper portion of the vine in the manner as illustrated in Fig. 2. It will be noted from the drawings that the implement can be applied to a vine or sapling without first cutting the vine or sapling in order to receive the grafting tool, for the reason that the jaws 5 and 6 and the co-acting knives carried thereon being arranged to one side of the longitudinal axis of the handles of the implement the length of the vine does not interfere with the operation of the implement for the reason that the same is applied to the vine substantially in position shown in Fig. 1, and by single action of the implement both grafting cuts are effected. When therefore it is desired to graft a vine the implement is applied to the vine as shown in Fig. 1 and a cut is made leaving the lower portion of the vine with an internal cut. The vine to be grafted thereto is cut in the same manner by the implement and the external cut is brought into position with the lower portion of the vine to be grafted as shown in Fig. 3, after which the parts are securely wrapped in the usual manner. When the cut has been made in the vine there is a natural tendency for the upper portion of the vine to remain within the knives 10 the same having been forced therein by the V-shaped knife 13 when the cut is made and in order to quickly disengage the implement from the vine the leaf spring 12 is provided between the knives 10 which spring is depressed when the grafting cut is made and as soon as the jaws are again separated by the handle spring 17 the leaf spring 12 forces the vine out of the knives 10 in a manner which is perfectly apparent.

Having thus fully described the invention what is claimed as new and what is desired to be secured by Letters Patent of the United States is:—

1. A grafting implement comprising a pair of pivoted handles, a suitable spring for holding said handles apart, jaws on the implement, said jaws being arranged to one side of the longitudinal axis of the handles, a knife bed on one of said jaws, said knife bed being provided with channels, a pair of cutting knives arranged in said channels, said knives forming a V, the points of which meet each other, a V-shaped knife carried on one of said jaws, said V-shaped knife being adapted to pass between the first mentioned knives, the cutting edges on said V-shaped knife being adapted to co-act with the cutting edges on the first mentioned knives, and a spring arranged between the first mentioned knives to force the vine from between the first mentioned knives, substantially as described.

2. A grafting implement comprising a pair of pivoted handles, a pair of jaws, said jaws being formed on one side of the longitudinal axis of the handles, a pair of knives arranged in V-shape on one of the jaws, a V-shaped knife arranged on the other jaw, said knives being provided with cutting edges and adapted to co-act with each other, and means arranged between the first mentioned knives to force the vine from the same, substantially as described.

In testimony whereof, I affix my signature, in presence of two witnesses.

LORENZO BRUNO.

Witnesses:
FRANK J. NAGEL,
C. HUGH DUFFY.